(12) United States Patent
Kukucka et al.

(10) Patent No.: US 12,018,708 B2
(45) Date of Patent: Jun. 25, 2024

(54) ANTI-SLIPPAGE FASTENER

(71) Applicant: GRIP HOLDINGS LLC, Brandon, FL (US)

(72) Inventors: Paul Kukucka, Brandon, FL (US); Thomas Stefan Kukucka, Brandon, FL (US)

(73) Assignee: GRIP HOLDINGS LLC, Brandon, FL (US)

( * ) Notice: Subject to any disclaimer, the term of this patent is extended or adjusted under 35 U.S.C. 154(b) by 687 days.

(21) Appl. No.: 17/047,628

(22) PCT Filed: Mar. 4, 2019

(86) PCT No.: PCT/IB2019/051742
§ 371 (c)(1),
(2) Date: Oct. 14, 2020

(87) PCT Pub. No.: WO2019/167032
PCT Pub. Date: Sep. 6, 2019

(65) Prior Publication Data
US 2021/0148395 A1 May 20, 2021

(51) Int. Cl.
*F16B 23/00* (2006.01)
(52) U.S. Cl.
CPC ................. *F16B 23/0038* (2013.01)
(58) Field of Classification Search
CPC .. F16B 23/007; F16B 23/003; F16B 23/0038; F16B 23/0061; F16B 31/027
USPC .................................. 411/403, 407
See application file for complete search history.

(56) References Cited

U.S. PATENT DOCUMENTS

| | | | |
|---|---|---|---|
| 3,908,489 A | | 9/1975 | Yamamoto et al. |
| 4,187,892 A | * | 2/1980 | Simmons ............ F16B 23/0007 81/460 |
| 7,225,710 B2 | | 6/2007 | Pacheco, Jr. |
| 8,105,367 B2 | * | 1/2012 | Austin ............... A61B 17/8014 606/280 |
| 9,651,078 B2 | * | 5/2017 | Santiago-Anadon ....... F16B 31/027 |

(Continued)

FOREIGN PATENT DOCUMENTS

| | | |
|---|---|---|
| DE | 4321325 A1 | 1/1995 |
| DE | 4321325 A1 | 1/1995 |

(Continued)

*Primary Examiner* — Flemming Saether

(57) ABSTRACT

An anti-slippage fastener that utilizes a plurality of engagement features to prevent slippage and facilitate torque transfer between a torque-tool and the fastener. The fastener includes a shank, a fastener head, and an external threading. The fastener head includes a rotation axis and a plurality of engagement walls; wherein the engagement walls are radially distributed about the rotation axis. Each of the engagement walls includes a first transversal line, a second transversal line, and a partially-circular portion. The first transversal line is terminally connected to the partially-circular portion. The second transversal line is terminally connected to the partially-circular portion, opposite the first transversal line. A center of the partially-circular portion is oriented away from the rotation axis. The shank is concentrically connected to the fastener head to act as the body of the fastener. The external threading is laterally connected along the shank, similar to traditional fasteners.

11 Claims, 11 Drawing Sheets

(56) References Cited

U.S. PATENT DOCUMENTS

| | | | |
|---|---|---|---|
| 10,100,864 B2 * | 10/2018 | Rathmann | F16B 23/003 |
| 10,612,581 B2 * | 4/2020 | Rajewski | F16B 23/0046 |
| 11,583,325 B2 * | 2/2023 | Seitz | A61B 17/8615 |
| 2016/0223005 A1 | 8/2016 | Rathmann | |
| 2018/0003241 A1 | 1/2018 | Goss | |

FOREIGN PATENT DOCUMENTS

| | | |
|---|---|---|
| DE | 10321284 A1 | 12/2004 |
| EP | 1731774 | 12/2006 |
| EP | 1731774 A1 | 12/2006 |
| WO | WO2013028875 A1 | 2/2013 |
| WO | 2015014480 A1 | 2/2015 |
| WO | 2018069190 A1 | 4/2018 |

\* cited by examiner

ANTI-SLIPPAGE FASTENER

The current application is a 371 of international Patent Cooperation Treaty (PCT) application PCT/IB2019/051742 filed on Mar. 4, 2019.

FIELD OF THE INVENTION

The present invention relates generally to fastener designs. More specifically, the present invention is an anti-slippage fastener, designed to prevent damage and stripping when said fastener is tightened or extracted.

BACKGROUND OF THE INVENTION

Hex bolts, nuts, screws, and other similar threaded devices are used to secure and hold multiple components together by being engaged to a complimentary thread, known as a female thread. The general structure of these types of fasteners is a cylindrical shaft with an external thread and a head at one end of the shaft. The external thread engages a complimentary female thread tapped into a hole or a nut and secures the fastener in place, fastening the associated components together. The head receives an external torque force and is the means by which the fastener is turned, or driven, into the female threading. The head is shaped specifically to allow an external tool like a wrench to apply a torque to the fastener in order to rotate the fastener and engage the complimentary female threading to a certain degree. This type of fastener is simple, extremely effective, cheap, and highly popular in modern construction.

One of the most common problems in using these types of fasteners, whether male or female, is the tool slipping in the head portion, or slipping on the head portion. This is generally caused by either a worn fastener or tool, corrosion, overtightening, or damage to the head portion of the fastener. The present invention is a fastener design that virtually eliminates slippage, when used in conjunction with the appropriate matching tool. The design uses a series of segmented portions that bite into the head of the fastener and allow for efficient torque transfer between the driving bit and the head portion of the fastener. The present invention eliminates the need for the common bolt extractors as they require unnecessary drilling and tools. With the development of electric screwdrivers, and drills, people have been using, power tools to apply the required torsional forces and remove various fasteners. Most driver end bits have a standardized one fourth inch hex holder and come in various configurations including but not limited to, square end, hex end, or star end.

DETAIL DESCRIPTIONS OF THE INVENTION

All illustrations of the drawings are for the purpose of describing selected versions of the present invention and are not intended to limit the scope of the present invention.

The present invention generally relates to fasteners such as screws and bolts. The present invention is an anti-slippage fastener that utilizes a specific head design to ensure that there is no slipping in between a torque tool device and the present invention. Resultantly, a significant amount of torque may be applied to the present invention for tightening or loosening purposes without causing damage. This is especially useful for extraction as the traditional means of extracting a seized fastener include damaging the fastener.

Figure 1:
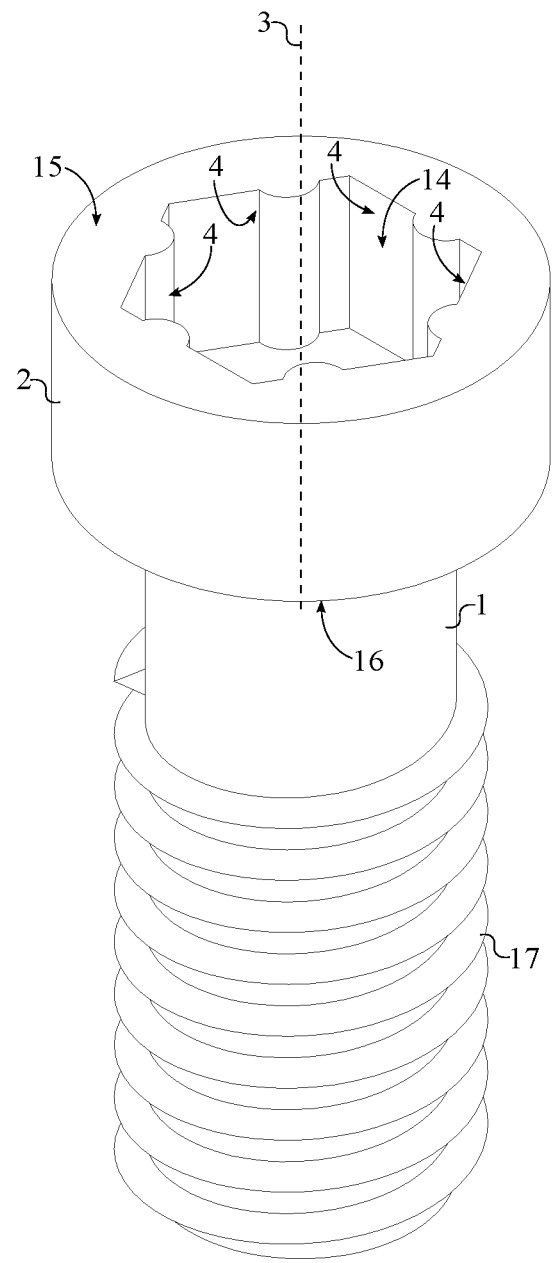
FIG. 1 is a perspective view of the present invention.
Figure 5:
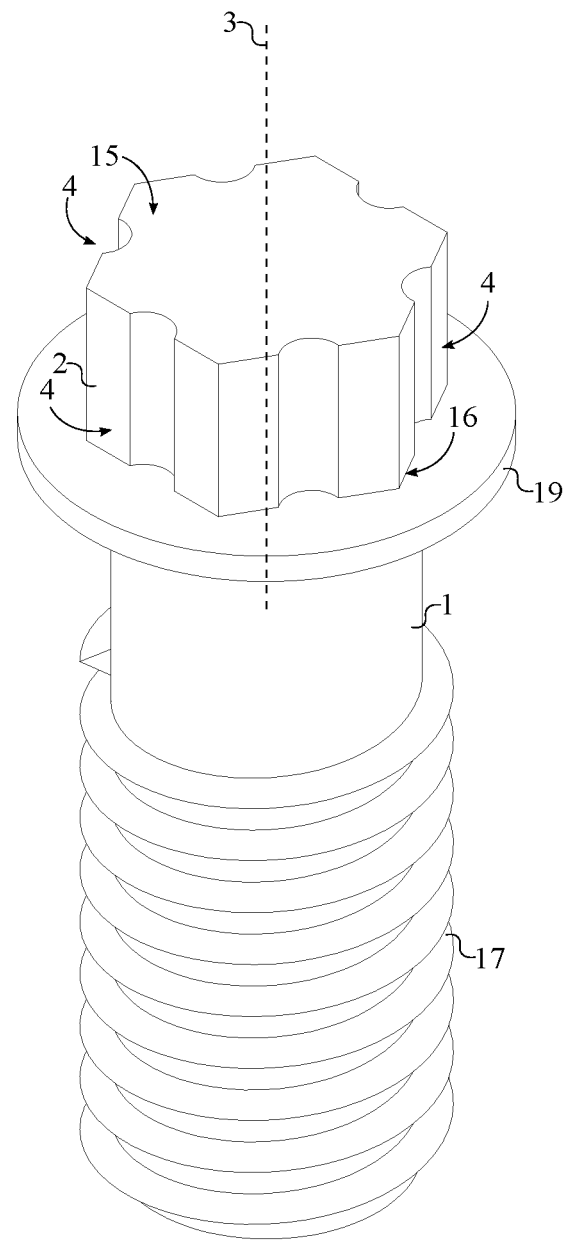
FIG. 5 is a perspective view of an alternative embodiment of the present invention.
Figure 6:
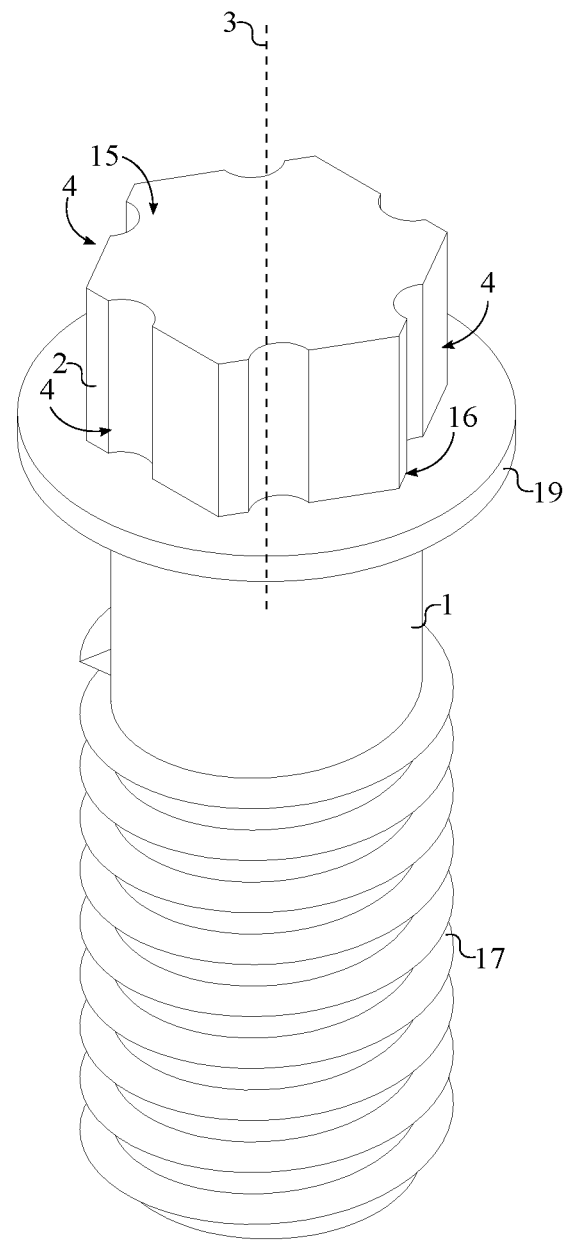
FIG. 6 is a perspective view of an alternative embodiment of the present invention.
Figure 7:
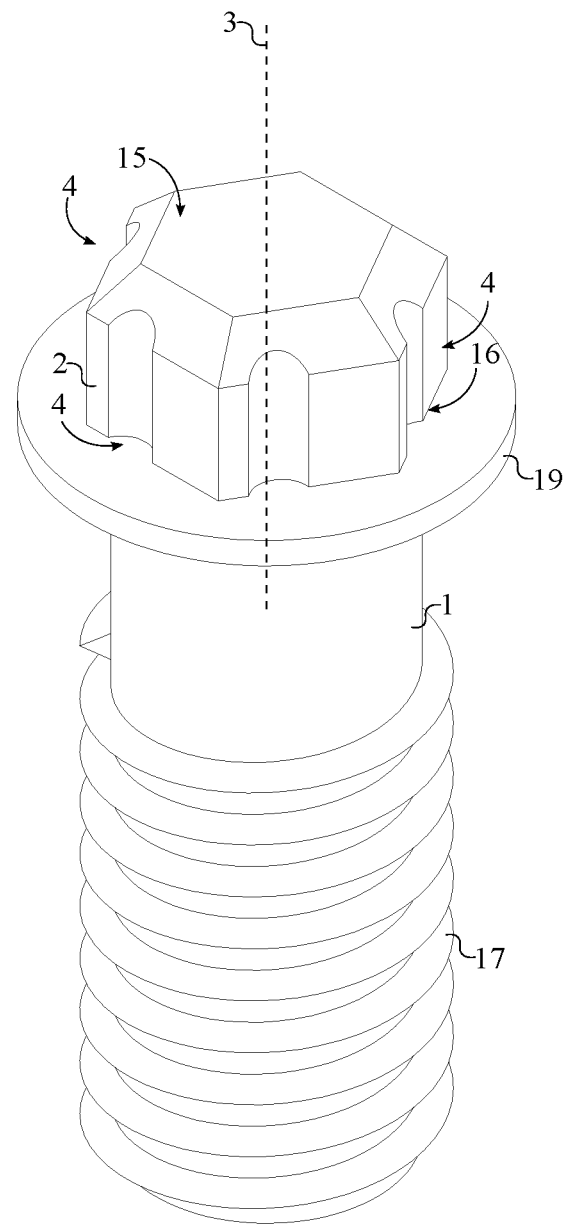
FIG. 7 is a perspective view of an alternative embodiment of the present invention.
Figure 8:
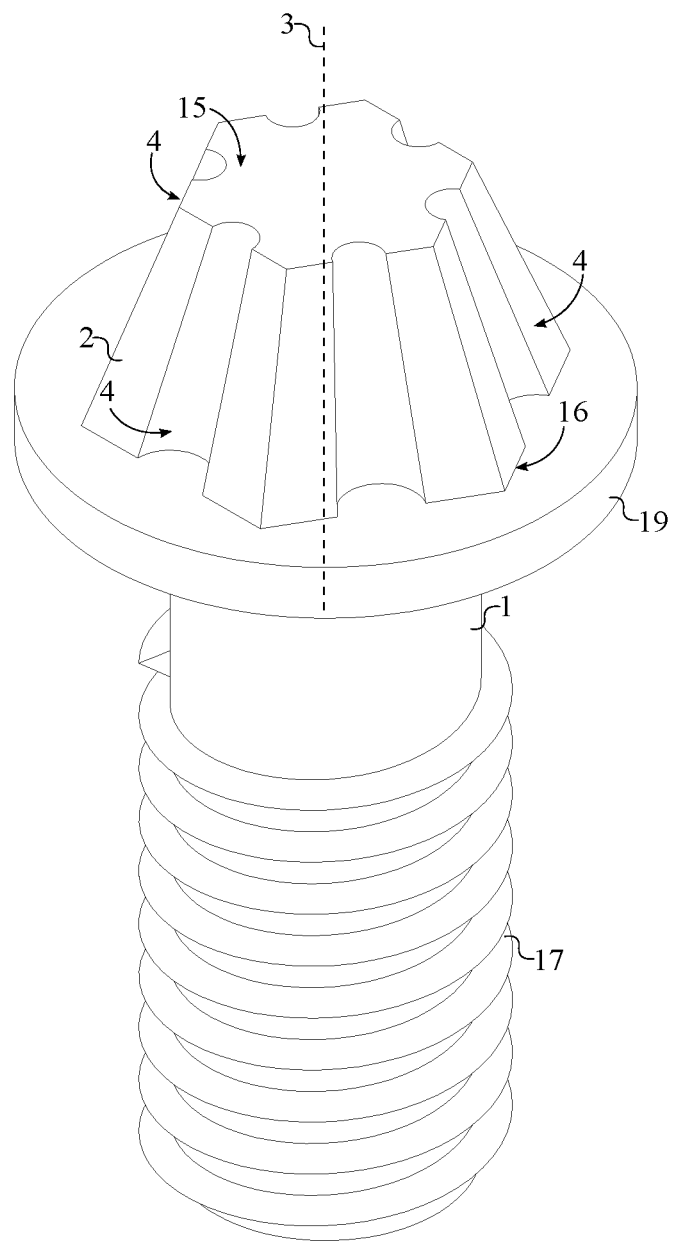
FIG. 8 is a perspective view of an alternative embodiment of the present invention.

Referring to FIG. 1 and FIG. 5, the present invention comprises a fastener head 2, a shank 1, and an external threading 17. The fastener head 2 acts as the interface portion of the present invention that receives a torque force from an external torque tool. Specifically, the fastener head 2 comprises a rotation axis 3, a plurality of engagement walls 4, a first base 15, and a second base 16. Each of the plurality of engagement walls 4 interlock and grip the external torque tool to efficiently receive and transfer a torque force from the external torque tool to the shank 1. The plurality of engagement walls 4 is radially distributed about the rotation axis 3; wherein, the number within the plurality of engagement walls 4 is subject to change. Additionally, each of the engagement walls comprises a first transversal line 6, a second transversal line 8, and a partially-circular portion 10. The first transversal line 6 and the second transversal line 8 make up the straight and flat portion for each of the plurality of engagement walls 4. The partially-circular portion 10 is a semi-circular line that acts as the interlocking feature for the each of the plurality of engagement walls 4 to prevent slippage and increase the amount of torque force the fastener head 2 may receive without damage and slippage. The curvature, size, and location of the partially-circular portion 10 is subject to change. In one embodiment, the partially circular portion 10 may be different shape including, but not limited to, triangular, rectangular, or square shaped. A rounded profile is used to decrease the number of potential high stress points, thus decreasing potential points where the fastener head 2 might break or slip. Specifically, the first transversal line 6 is terminally connected to the partially-circular portion 10. Opposite the first transversal line 6, the second transversal line 8 is terminally connected to the partially-circular portion 10. It is preferred that the first transversal line 6 and the second transversal line 8 are colinearly aligned with each other and, therefore, are parallel to each other. Furthermore, the partially-circular portion 10 is configured such that a center 11 of the partially-circular portion 10 is oriented away from the rotation axis 3. The first base 15 and the second base 16 are positioned parallel and opposite to each other, across the plurality of engagement walls 4. Additionally, the first base 15 and the second base 16 are oriented perpendicular to each of the plurality of engagement walls 4.

Resultantly, the plurality of engagement walls 4, the first base 15, and the second base 16 delineate a prism shape for the fastener head 2.

Figure 2:
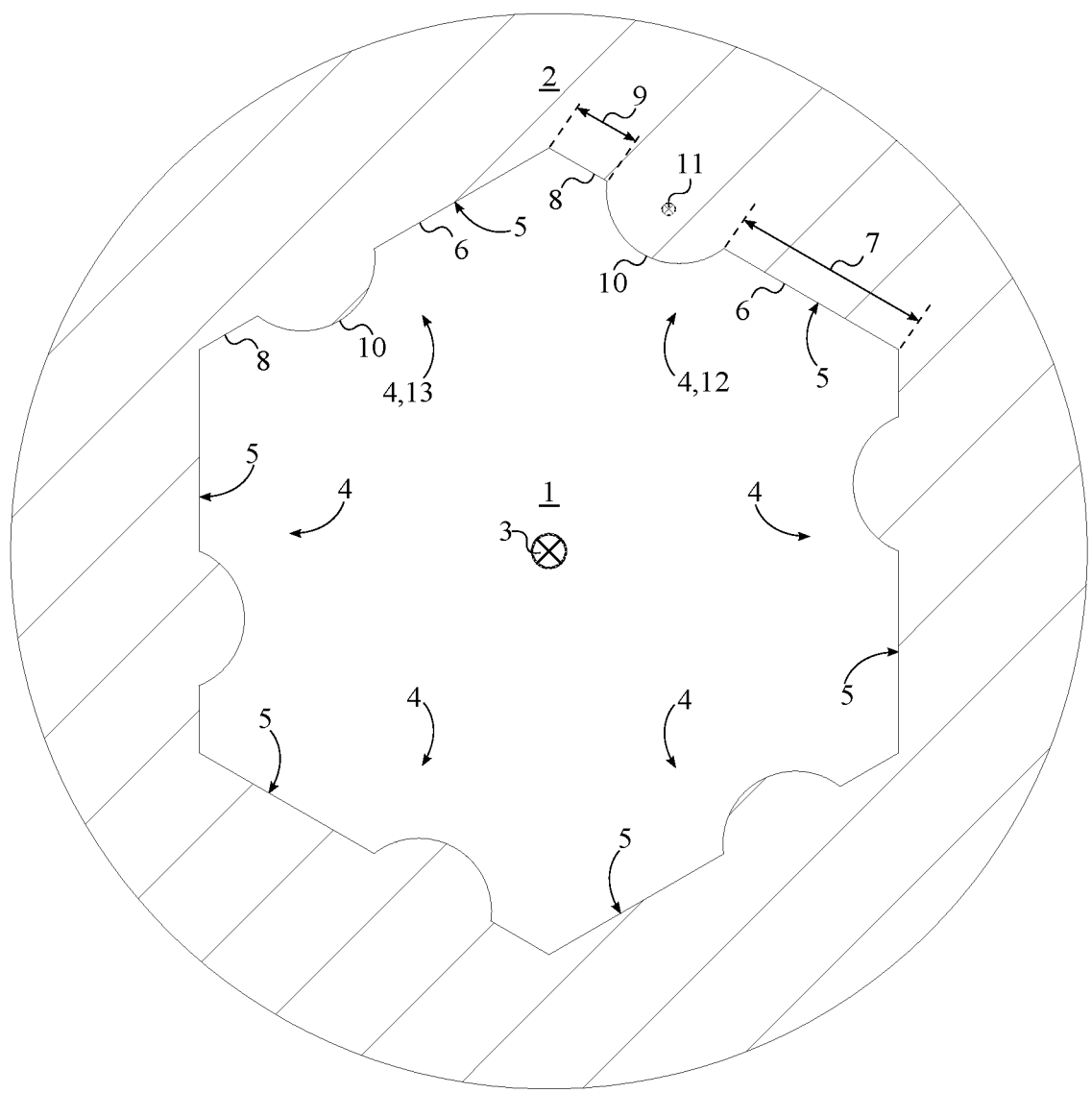
FIG. 2 is a sectional cut of the present invention depicted in FIG. 1.
Figure 3:
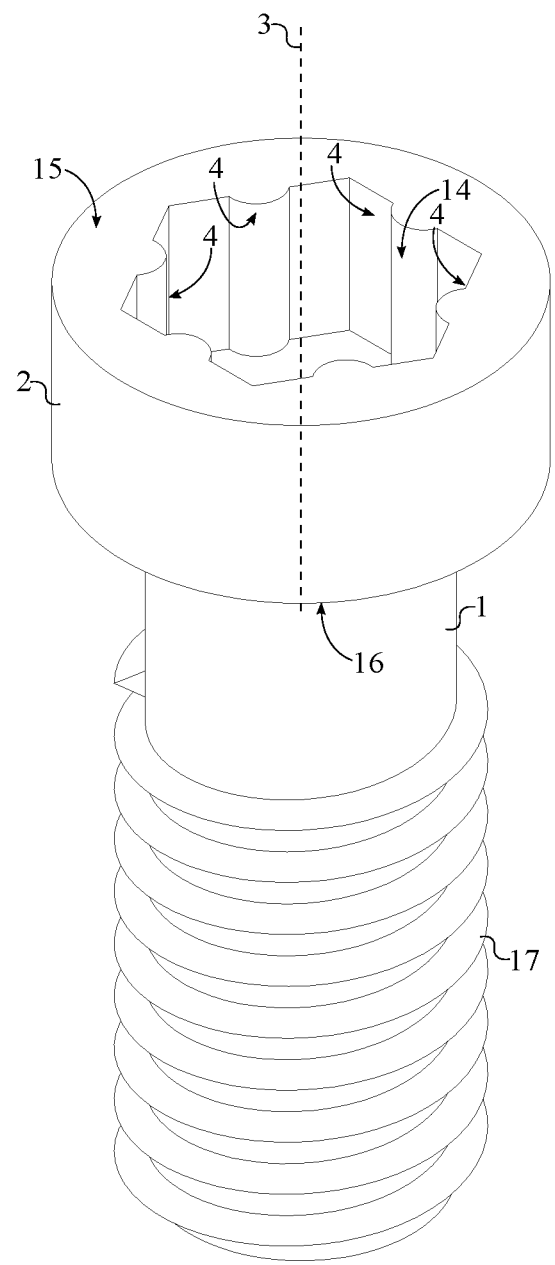
FIG. 3 is a perspective view of an alternative embodiment of the present invention.
Figure 4:
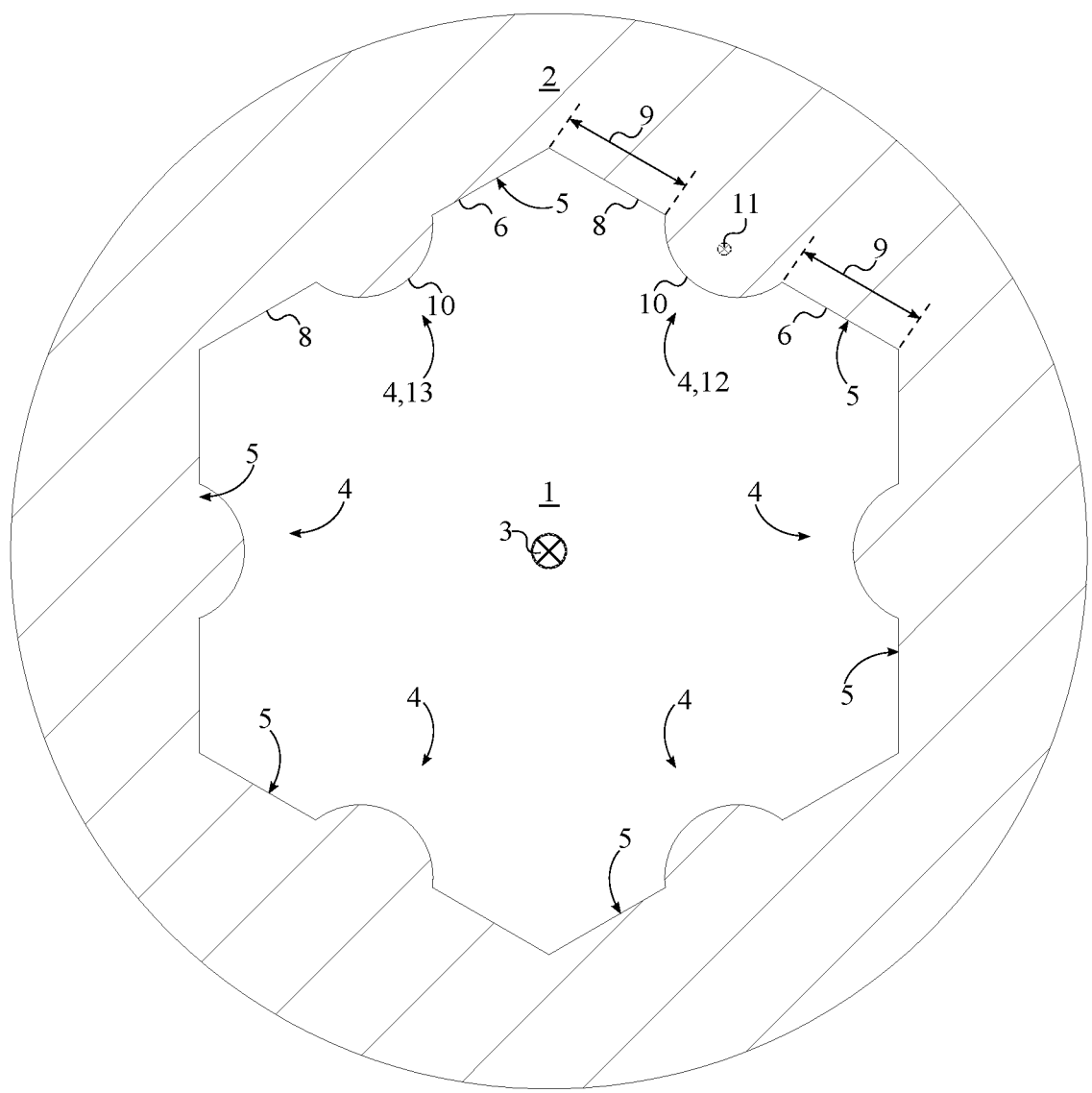
FIG. 4 is a sectional cut of the present invention depicted in FIG. 3.
Figure 11:
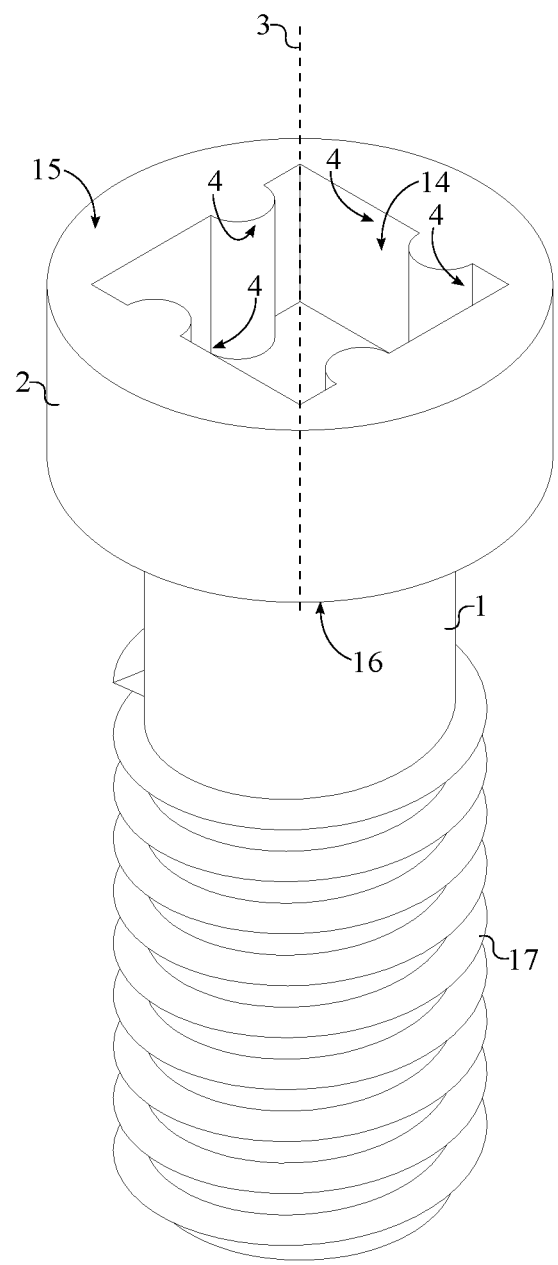
FIG. 11 is a perspective view of an alternative embodiment of the present invention.

Referring to FIG. 2, the plurality of engagement walls 4 comprises an arbitrary engagement wall 12 and an adjacent engagement wall 13. The arbitrary engagement wall 12 is any feature within the plurality of engagement walls 4 and the adjacent engagement wall 13 is the feature directly next to the arbitrary engagement wall 12. In relation to each other the plurality of engagement walls 4, the second transversal line 8 of the arbitrary engagement wall 12 is terminally connected to the first transversal line 6 of the adjacent engagement wall 13, opposite the partially-circular portion 10 of the adjacent engagement wall 13. As mentioned above, the present invention may be designed to fit a variety of torque-tools. This is achieved by varying the number of engagement walls within the plurality of engagement walls 4 to compliment different types of torque-tools. The number within the plurality of engagement walls 4 corresponds to the number of sides of the fastener head 2. For instance, for a pentagon shaped fastener head 2, there are five engagement walls within the plurality of engagement walls 4. A hexagon shaped fastener head 2 requires six engagement walls within the plurality of engagement walls 4, an example is seen in FIG. 3 and FIG. 4. In one embodiment, the fastener head 2 is implemented as a square prism. For this, a quantity for the plurality of engagement walls 4 is four. Additionally, for this, the second transversal line 8 of the arbitrary sidewall is terminally connected to the first transversal line 6 of the adjacent sidewall at right angle as seen in FIG. 11.

The shank 1 is an elongated cylinder that makes up the body of the present invention. The length and diameter of the shank 1 is subject to change to meet the needs and preferences of the user. The external threading 17 is a helical structure used to convert between rotational and linear movement. Additionally, the external threading 17 engages a complimentary female threading of an external structure to secure and attach the present invention to the external structure. The shank 1 is concentrically and terminally mounted to the fastener head 2, similar to traditional screw designs. Specifically, the shank 1 is terminally and normally connected to the second base 16. The external threading 17 extends along the shank 1 and is laterally connected to the shank 1. The specific characteristics of the external threading 17, such as lead, pitch, and start, are subject to change to meet the needs and preferences of the user.

Figure 9:
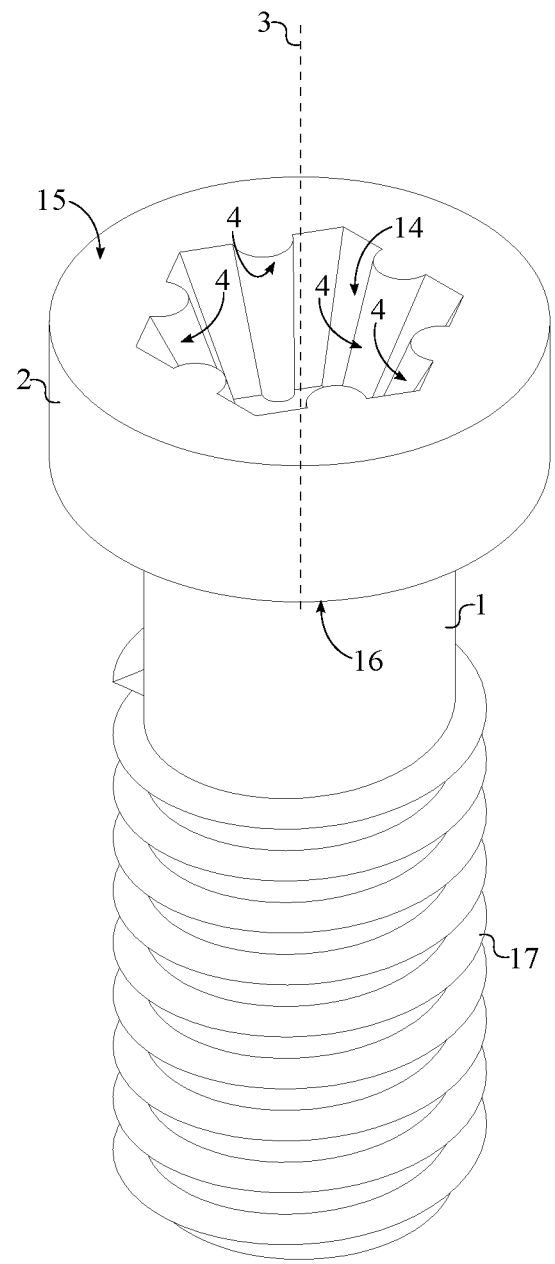
FIG. 9 is a perspective view of an alternative embodiment of the present invention.
Figure 10:
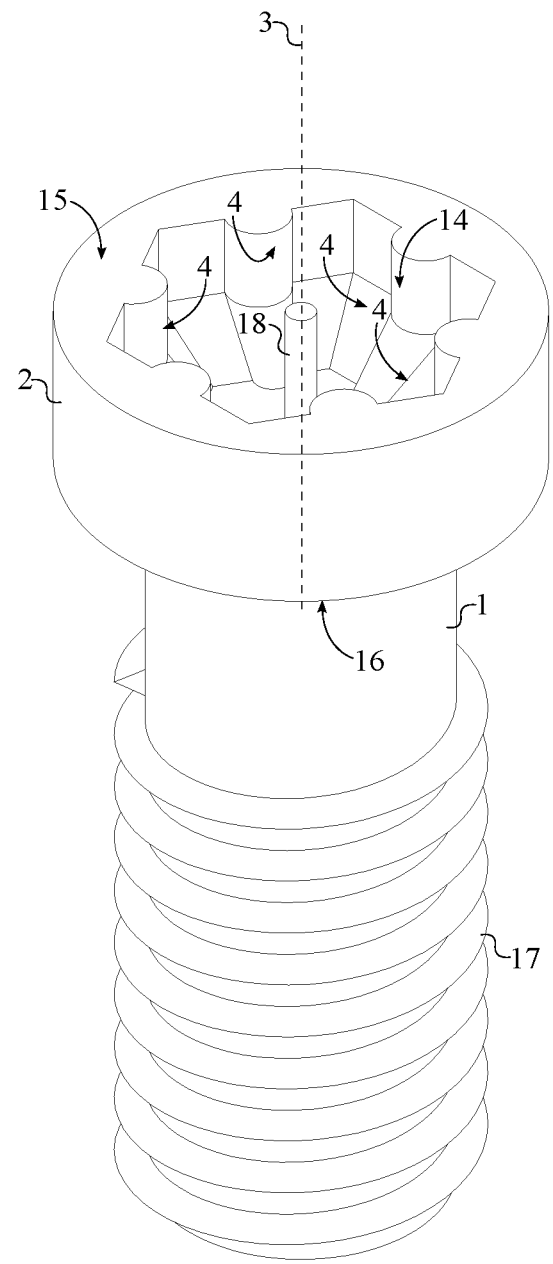
FIG. 10 is a perspective view of an alternative embodiment of the present invention.

Referring to FIG. 1, FIG. 9, and FIG. 10, the fastener head 2 may be implemented as a socket fastener. In this embodiment, the fastener head 2 is outwardly extending from the cross section 5 of each of the plurality of engagement walls 4. In other words, the body of the fastener head 2 is external to the plurality of engagement walls 4 and the plurality of engagement walls 4 delineate a tool-receiving cavity 14. To engage and rotate this embodiment of the present invention, a torque-tool with a bit shank 1 is used and positioned within the tool-receiving cavity 14; a complimentary profile matching the profile of the plurality of engagement walls 4 is preferred, although, alternative profiles may be used as well. In one embodiment of the present invention, the plurality of engagement walls 4 tapers the tool-receiving cavity 14 from the first base 15 to the second base 16. The tapering feature allows for torque-tools of varying size to engage the fastener head 2, thus increasing the versatility of the present invention. For the socket fastener embodiment of the present invention, an edge between each of the plurality of engagement walls 4 and the second base 16 may be chamfered or rounded.

Referring to FIG. 10, in one embodiment, the present invention further comprises a security pin 18. The security pin 18 ensures that only specific torque-tools are capable of engaging the socket fastener embodiment of the present invention, thus restricting the tightening or extracting of the present invention to only personnel with the appropriate equipment. The security pin 18 is an elongated cylinder that length of the fastener head 2 from the first base 15 to the second base 16. The security pin 18 is concentrically positioned within the rotation axis 3 and is mounted within the tool-receiving cavity 14. Thus, to engage the present invention, a torque-tool with a complimentary cavity is required.

Referring to FIG. 5, the present invention may further comprise an annular flange 19 that acts similar to a washer to distribute the load of the present invention to the surface of the external structure that the present invention is attached to. The annular flange 19 is a disk with a central hole, wherein the central hole is sized to the outer diameter of the shank 1. The annular flange 19 is concentrically positioned within the rotation axis 3 and positioned adjacent to the fastener head 2. Additionally, the annular flange 19 is laterally connected to shank 1. The outer diameter, thickness, and design of the annular flange 19 is subject to change. When the present invention is tightened into an external structure, the annular flange 19 sits directly against the external surface of the external structure and prevents the fastener head 2 from being driven into the external surface.

Referring to FIG. 5, FIG. 6, FIG. 7, and FIG. 8, the fastener head 2 may be implemented as a standard screw head. The fastener head 2 is laterally delineated by the cross section 5 of each of the plurality of engagement walls 4. In this embodiment, the body of the fastener head 2 is within the cross section 5 of the plurality of engagement walls 4 such that a torque-tool with a socket is required to engage the fastener head 2. In this embodiment, the partially-circular portion for each of the plurality of engagement walls 4 is a cavity. In one embodiment, the fastener head 2 tapers from the second base 16 to the first base 15 to allow a range of socket size to fit over and interlock with the fastener head 2 of the present invention, thus increasing the versatility of the present invention. For the standard screw embodiment of the present invention, an edge between each of the plurality of engagement walls 4 and the first base 15 may be chamfered or rounded. Additionally, for the standard screw embodiment, a security recess may be used. The security recess is a cavity that is positioned concentric with the rotation axis 3. Additionally, the security recess normally traverses into the fastener head 2 from the first base 15 to the second base 16.

Referring to FIG. 2 and FIG. 4, each of the plurality of engagement walls 4 may be implemented in a multitude of designs to create varying secure designs. In one embodiment, referring to FIG. 4, a length 7 of the first transversal line 6 is equal to a length 9 of the second transversal line 8. This outlines a symmetrical design wherein the partially-circular portion 10 is centrally located and provides equal traction for tightening and loosening of the present invention. In another embodiment of the present invention, the length 7 of the first transversal line 6 is greater than the length 9 of the second transversal line 8 as seen in FIG. 2. Thus, the partially-circular portion 10 is positioned offset from the center of the corresponding wall from the plurality of engagement walls 4. This ensures adequate torque force is transferred to the present invention in the clockwise rotation for tightening purposes. In another embodiment, the present invention is implemented for extracting purposes. In this embodiment, the length 7 of the first transversal line 6 is less than the length 9 of the second transversal line 8. This ensures adequate torque force is transferred to the present invention in the counter-clockwise rotation for extraction purposes.

Although the invention has been explained in relation to its preferred embodiment, it is to be understood that many other possible modifications and variations can be made without departing from the spirit and scope of the invention as hereinafter claimed.

What is claimed is:

1. An anti-slippage fastener comprising:
    a shank;
    a fastener head;
    an external threading;
    the fastener head comprising a rotation axis and a plurality of engagement walls;
    the plurality of engagement walls being radially distributed about the rotation axis;
    a cross section for each of the plurality of engagement walls comprising a first transversal line, a second transversal line, and a partially-circular portion;
    the first transversal line being terminally connected to the partially-circular portion;
    the second transversal line being terminally connected to the partially-circular portion, opposite the first transversal line;
    a length of the first transversal line being greater than a length of the second transversal line or less than a length of the second transversal line;
    a center of the partially-circular portion being oriented away from the rotation axis;
    wherein the fastener head is outwardly extended from the cross section of each of the plurality of engagement walls;
    the plurality of engagement walls delineating a tool-receiving cavity;
    the shank being concentrically and terminally mounted to the fastener head;
    the external threading extending along the shank; and
    the external threading being laterally connected to the shank.

2. The anti-slippage fastener as claimed in claim 1 comprising:
    the fastener head further comprising a first base and a second base;
    the first base and the second base being positioned parallel and opposite to each other across the plurality of engagement walls;
    the first base and the second base each being oriented perpendicular to each of the plurality of engagement walls; and
    the shank being terminally connected to the second base.

3. The anti-slippage fastener as claimed in claim 1 comprising:
    the plurality of engagement walls comprising an arbitrary engagement wall and an adjacent engagement wall; and
    the second transversal line of the arbitrary engagement wall being terminally connected to the first transversal line of the adjacent engagement wall, opposite the partially-circular portion of the adjacent engagement wall.

4. The anti-slippage fastener as claimed in claim 1 comprising:
    the second transversal line of the arbitrary sidewall being terminally connected to the first transversal line of the adjacent sidewall at a right angle;
    wherein a quantity for the plurality of engagement walls is four.

5. The anti-slippage fastener as claimed in claim 1 comprising:
    the fastener head further comprising a first base and a second base;
    the first base and the second being positioned parallel and opposite to each other across the plurality of engagement walls; and
    the shank being terminally connected to the second base.

6. The anti-slippage fastener as claimed in claim 5, wherein the plurality of engagement walls tapers the tool-receiving cavity from the first base to the second base.

7. The anti-slippage fastener as claimed in claim 5 comprising:
    a security pin;
    the security pin being concentrically positioned with the rotation axis; and
    the security pin being mounted within the tool-receiving cavity.

8. The anti-slippage fastener as claimed in claim 1, wherein the first transversal line and the second transversal line are positioned colinear with each other.

9. The anti-slippage fastener as claimed in claim 1 comprising:
    an annular flange;
    the annular flange being concentrically positioned with the rotation axis;
    the annular flange being positioned adjacent to the fastener head; and
    the annular flange being laterally connected to the shank.

10. The anti-slippage fastener as claimed in claim 1 comprising:
    the fastener head being laterally delineated by the cross section of each of the plurality of engagement walls.

11. The anti-slippage fastener as claimed in claim 1 comprising:
    the fastener head being laterally delineated by the cross section of each of the plurality of engagement walls;
    the fastener head further comprising a first base and a second base;
    the first base and the second being positioned parallel and opposite to each other across the plurality of engagement walls;
    the shank being terminally connected to the second base; and
    the fastener head tapering from the second base to the first base.

* * * * *